2,739,063
Patented Mar. 20, 1956

2,739,063

BACITRACIN FEED SUPPLEMENTS FROM CRUDE FERMENTATION LIQUORS

Herbert L. Wehrmeister, Terre Haute, Ind., assignor to Commercial Solvents Corporation, Terre Haute, Ind., a corporation of Maryland No Drawing. Application August 29, 1951, Serial No. 244,263

1 Claim. (Cl. 99—2)

My invention relates to a feed supplement and more particularly it relates to a feed supplement containing the antibiotic bacitracin adsorbed on an activated clay as more particularly described hereinafter.

For some years there has been extensive study of the need for various nutrients in feed for poultry and livestock. This study has resulted in the evolution of feeds compounded to include all of the ingredients necessary to provide the proper proportions of nutrients such as, for example, proteins, amino acids, choline, etc. as well as the formulation of rations designed for specific feeding purposes. Following the development of rations balanced in essential nutrients, it was found that other substances could be included in the rations which would serve as growth promoters and increase the rate at which poultry and livestock developed resulting in a larger animal at an earlier age. Growth-promoters commonly employed by feed manufacturers include vitamin $B_{12}$, animal protein factor, commonly referred to as "APF," etc. Quite recently it has been found that in addition to the growth-promoters, various antibiotics could be added to feeds to serve as additional growth stimulants and aid in the production of even larger animals at an even earlier age than those obtained through the use of feeds containing only such substances as the vitamin $B_{12}$, and the APF mentioned above. Antibiotics such as aureomycin, penicillin, terramycin, and bacitracin have been found to be suitable for this purpose and commercial feed supplements containing these antibiotics are presently available to feed manufacturers for inclusion in their products.

In the past, antibiotic feed supplements have been produced by the submerged culture of antibiotic-producing organisms such as for example *Penicillium chrysogenum*, *Bacillus subtilis* (Tracy), etc. in nutrient media until the antibiotic concentration in the medium reaches the maximum practically obtainable, and then evaporating the water and drying the residue to obtain a material rich in the antibiotic and suitable for use as a feed supplement. In the production of a bacitracin feed supplement by this method however, the heat required for the evaporation and drying steps in the process causes the destruction of a considerable proportion of the bacitracin produced in the nutrient medium because of the high heat-sensitivity of this antibiotic. As a result of this bacitracin destruction, it is oftentimes difficult to produce a bacitracin feed supplement, the use of practical amounts of which will provide enough bacitracin to obtain the growth-promoting effect desired. The bacitracin recovered as a feed supplement from the fermentation medium in which the bacitracin is produced by the process of evaporation and drying mentioned above rarely results in yields exceeding 30% and thus it is obvious that the cost of a bacitracin feed supplement produced in this manner is considerably increased as a result of the bacitracin destruction due to the heat sensitivity of the antibiotic. It is apparent then, that a more economical process for the production of a bacitracin feed supplement is greatly desired.

I have now discovered a process for producing a new bacitracin feed supplement wherein the bacitracin recovered in the feed supplement from the fermentation medium is two to three times that obtained in prior art processes and therefore I am able to produce a feed supplement at a greatly reduced cost and in greatly increased quantities without the necessity of expanding the fermentation capacity.

Generally my new process consists of adding an adsorbent clay to the fermentation medium which adsorbs the bacitracin from the medium, removing the adsorbate and water insoluble solids from the medium, and drying the solid materials removed to obtain a dry bacitracin feed supplement. Tests have indicated that my new product besides being obtained in greatly increased yields is very effective as a growth stimulant when used in feeds.

In carrying out my process, I first add the adsorbent clay to the fermentation medium; however, I have found that the pH of the fermentation medium has some effect on the extent of adsorption which takes place. When the pH is adjusted to between 3 and 7 the adsorption which takes place on a given amount of the activated clay is greater than when the pH of the fermentation medium is much outside of this range. The pH range which I prefer to employ is between 4 and 6; however, there is not sufficient difference in adsorption capacity between these two pH values to make this a deciding factor in the operation of the process and thus the choice of pH within this range depends on factors other than adsorption capacity such as for example corrosion, quantity of acid required, etc. The particular acid to be employed in adjusting the pH does not appear to be critical since I have found that acids such as acetic, sulfuric, phosphoric, hydrochloric, etc. may be used.

The adsorbent clay which I can employ in my process can be any activated adsorbent clay the primary constituent of which is a kaolinite or a montmorillonite and it is to be understood that I mean to include in the above definition those clays which are naturally adsorbent as well as those which are acid activated to render them adsorbent. I have found that a number of commercial clay preparations are suitable for use in my process among which are The American Colloid Company's Volclay and Panther Creek bentonites, United Clay Mines Corporation's Elkins clay and Evans clay which are heat-treated fuller's earth and their Burgess clay which is a calcined kaolin, the Filtrol Corporation's Super Filtrol F. O., Filtrol, and Neutrol I which are acid-activated earths consisting chiefly of montmorillonite. Of these clays, I have found that active bentonite is particularly suited for my process since the addition of not substantially more than an amount equivalent to 1.5% by weight of the fermentation medium at a pH of 6 results in the adsorption of substantially all of the bacitracin activity contained in the fermentation medium. Other clays such as those consisting chiefly of pyrophyllite, talc, floridin and other adsorbent materials such as activated alumina, silica gel, etc. have a capacity for adsorbing bacitracin from the fermentation medium but usually the quantity of clay or other adsorbent material required to adsorb practical amounts of bacitracin from the fermentation medium is such as to occasion the introduction of larger amounts of ash in the feed supplement than when materials such as bentonite, kaolinite, etc. are employed. Therefore as I have mentioned above I prefer to use those adsorbent clays wherein the introduction of only a comparatively small amount results in the adsorption of substantially all of the bacitracin activity from the fermentation medium and thus the amount of ash introduced into the final product is at a minimum. I intend, however, to include all operative clays regardless of the fact that they might have a relatively small capacity for adsorbing bacitracin.

Following the addition of the adsorbent clay to the fermentation medium, I prefer to agitate the mixture so as to insure intimate contact of the adsorbent clay with the bacitracin in the medium and thus facilitate the adsorption of a maximum amount of the antibiotic. After adsorbing the bacitracin on the activated clay, I then separate the adsorbate and the water-insoluble solids from the treated fermentation medium. The solids can be separated from the medium by any convenient means such as by filtration, by centrifugation, etc. It should be noted that when the solids are to be separated by centrifugation, the medium should be passed through a relatively coarse strainer, such as for example about 20 or 30 mesh, in order to remove the larger solids and thus guard against the possibility of plugging the nozzles on the centrifuge. However, if the centrifuge nozzles are large enough to accommodate the largest solids in the medium, there is no necessity for straining the mixture as described herein.

Following the de-watering operation, as by centrifugation, the material is dried to produce the feed supplement. The drying operation can be accomplished by any means such as for example by air drying, spray drying, rotary drum drying, etc. Spray drying is a convenient method for drying the sludge from the centrifuge and I prefer to employ this combination of de-watering and drying since filtration has the disadvantage of requiring in some cases a filter aid which tends to increase the ash content of the product and also the filter cake must be slurried with water in order to be able to employ the spray dryer in effecting the final drying operation.

Following the drying operation, the product obtained is a material rich in the antibiotic bacitracin and since the bacitracin assay of the fermentation medium will vary from fermenter to fermenter resulting in the production of different lots of the product having a different bacitracin content, I prefer at this point to dilute the product of my process to a constant bacitracin content. The product of my process can be diluted with any convenient material but I prefer to employ other organic nutrients such as for example soybean meal, fish meal, etc., vitamin-containing nutrient materials, such as, for example, riboflavin or vitamin $B_{12}$ feed supplements or even other supplements containing growth-promoting substances such as APF. In this manner I am able to provide a product containing a guaranteed amount of bacitracin thus assuring the use of constant amounts in the compounding of feeds.

As noted above the product of my process is diluted to produce a commercial form of feed supplement. In using feed supplements only comparatively small amounts are employed in compounding the final feed product, such as about 1 to 10 pounds per ton of feed depending on the bacitracin content, which is finally fed to poultry and livestock. Thus the dilutions of the original product keep reducing the ash content (introduced as clay) until in a feed containing about 10 pounds of supplement per ton, the ash content from the clay introduced is at a maximum of about 0.07%.

The following examples are offered to illustrate my invention and I do not intend to be limited to the particular materials, amounts, or processes shown therein but rather I intend for all equivalents apparent to those skilled in the art to be included within the scope of the invention as described in this specification and the attached claims.

EXAMPLE I

A series of runs was carried out wherein 3.5 liters of a bacitracin fermentation medium in which the organism *Bacillus subtilis* (Tracy) had been cultured was acidified to a pHh of 6.0 with sulfuric acid. The mixture was then passed through a 20 mesh screen to remove the larger solid particles. To 3 liters of the sieved medium, Panther Creek bentonite produced by The American Colloid Company was added in the amounts indicated in the following table. The mixture was stirred for approximately 20 minutes and then was passed through a Sharples centrifuge. The sludge from the centrifuge was drum dried and assayed with the results shown in Table I.

*Table I*

| Run No. | 1 | 2 | 3 | 4 |
| --- | --- | --- | --- | --- |
| Assay of Sieved Medium Units Bacitracin/ml | 85 | 58 | 50 | 60 |
| Grams Bentonite/100 ml | 1.5 | 1.7 | 1.7 | 1.7 |
| Assay of Centrifuged Medium Units Bacitracin/ml | 9 | 4 | 1 | 2 |
| Grams of Dried Product | 88 | 104 | 90 | 99 |
| Assay of Product Units Bacitracin/gram | 2,115 | 1,500 | 1,335 | 1,435 |
| Yield percent (based on Assay of Sieved Medium) | 73 | 90 | 80 | 79 |

EXAMPLE II

The following table shows the per cent of the bacitracin activity contained in the fermentation medium which is adsorbed from the medium when varying amounts of adsorbent clays are added.

*Table II*

| Additive | Super Filtrol | Panther Creek Bentonite |
| --- | --- | --- |
| pH | 4.0 | 6.0 |
| Assay of Medium Units Bacitracin/ml | 99 | 87 |

| Grams Additive/100 ml.: | Percent Activity Adsorbed | |
| --- | --- | --- |
| 0.5 | 40 | |
| 1.0 | 52 | 89 |
| 1.1 | | 95 |
| 1.3 | | 100 |
| 1.5 | 70 | 100 |
| 1.7 | | 100 |
| 1.9 | | 100 |
| 2.0 | 81 | |
| 2.5 | 94 | |
| 3.0 | 99 | |

It is seen from the above table that as small an amount as 1.1% by weight of the active bentonite adsorbed no less than 95% of the bacitracin present in the fermentation medium while proportions of 1.3% or over caused complete adsorption.

EXAMPLE III

The following table indicates the effect of the pH of the fermentation medium upon the amount of bacitracin activity adsorbed from the fermentation medium using 1.5 grams of various adsorbents per 100 ml. of the fermentation medium.

*Table III*
PERCENT ACTIVITY ADSORBED

| pH | Super Filtrol | Volclay Bentonite | Panther Creek Bentonite |
| --- | --- | --- | --- |
| 3 | | | |
| 4 | 67 | 100 | 99 |
| 5 | 60 | 100 | 99 |
| 6 | 63 | 100 | 100 |
| 7 | 58 | | 91 |
| 8 | 50 | | |
| 9 | 33 | | |

EXAMPLE IV

The pH of 33,500 gallons of bacitracin fermentation medium was adjusted to 4.5 with 60 gallons of sulfuric acid. The resulting mixture was then sieved through a 20 mesh screen following which 4,200 pounds of Panther Creek bentonite were added and the mixture, following agitation, passed through a centrifuge at the rate of 2,230 gallons per hour. The sludge from the centrifuge was then passed through a spray drier from which was obtained 7,120 pounds of dry product. The following table gives the data obtained from the run.

Table IV

| | |
|---|---|
| Fermentation medium assay units/ml | 81 |
| Sludge assay units/ml | 242 |
| Centrifuged medium assay units/ml | 4 |
| Spray dried product units/gram | 1730 |
| Overall yield, percent | 54 |

EXAMPLE V

A chick-feeding test was conducted wherein day-old chicks were divided into four groups with one group being fed a basal feed containing 20% soybean oil meal and 5% fish meal, two of the remaining three groups being fed the same basal ration supplemented with different amounts of a bacitracin feed supplement prepared according to my invention using bentonite as the adsorbent material, and the fourth group being fed the same basal ration supplemented with bentonite alone. The adsorbate supplement contained 10 grams of bacitracin per pound. Chick weights at 30 days for the various rations are shown in the following table and the results indicate that my new product is an efficient growth promoter. No toxic effects of any kind were noted.

Table V

| Supplement: | 30 day wt. grams |
|---|---|
| None | 256 |
| Bentonite 1 lb./ton | 259 |
| Bacitracin adsorbate 1 lb./ton | 282 |
| Bacitracin adsorbate 5 lbs./ton | 280 |

EXAMPLE VI

A chick-feeding test was conducted wherein day-old chicks were divided into seven groups. Group 1 received a basal ration containing 20% soybean oil meal and 5% fish meal. Groups 2 and 3 received the same basal ration supplemented with different amounts of a bacitracin adsorbate feed supplement prepared according to my invention, the supplement containing 10 grams of bacitracin per pound. Groups 4 through 7 received the basal ration supplemented with a bacitracin feed supplement prepared by the prior art method of evaporating the bacitracin fermentration medium and drying the residue. This latter feed supplement contained only 5 grams of bacitracin per pound. The following table shows 28-day chick weights and feed efficiencies which may be defined as grams of feed required to produce a one-gram weight increase per chick.

Table VI

| Group No. | Supplement | 28 Day Wt. Grams | Feed Efficiency |
|---|---|---|---|
| 1 | None | 257 | 2.34 |
| 2 | Bacitracin Adsorbate, 1 lb./ton | 285 | 2.15 |
| 3 | Bacitracin Adsorbate, 5 lbs./ton | 289 | 2.24 |
| 4 | Bacitracin Evaporate, 2 lbs./ton | 271 | 1.90 |
| 5 | ...do... | 291 | 2.24 |
| 6 | Bacitracin Evaporate, 10 lbs./ton | 287 | 2.33 |
| 7 | ...do... | 289 | 2.12 |

The results shown in Table VI indicate that my new bacitracin feed supplement which contains the ash-producing bentonite is equally effective as a growth-promoter as the bacitracin feed supplement produced by the prior art methods of evaporation of the fermentation medium followed by drying of the residue, the latter feed supplement being comparatively free of inorganic, ash-producing materials.

Now having described my invention, what I claim is:

In the production of bacitracin feed supplements from crude fermentation liquors in which bacitracin has been produced and containing insoluble solids derived from the fermentation in suspension therein, the process which consists essentially in adjusting the pH of such a fermentation liquor within the range of from about 4 to 6, adding not substantially more than about 1.5% by weight of an active bentonite to the liquor to adsorb the bacitracin present, agitating the liquor and then recovering the bentonite with its adsorbed bacitracin in admixture with the said insoluble solids present in the original fermentation liquor and drying.

References Cited in the file of this patent

UNITED STATES PATENTS

| | | |
|---|---|---|
| 2,214,909 | Pittman et al. | Sept. 17, 1940 |
| 2,261,918 | Pittman et al. | Nov. 4, 1941 |
| 2,261,922 | Pittman et al. | Nov. 4, 1941 |
| 2,449,340 | Tanner et al. | Sept. 14, 1948 |
| 2,457,887 | Goorley | Jan. 4, 1949 |
| 2,561,812 | Morell | July 15, 1951 |
| 2,582,921 | Charney | Jan. 15, 1952 |

OTHER REFERENCES

Parvo Feed Supplement, Lederle Lab. Div., 1947, pages 10 and 11.

Peppler et al.: Poultry Science, July 1950, pages 520–525.